United States Patent

[11] 3,608,696

[72] Inventors Joseph P. Lagermasini
Towanda;
Leadom A. Warner, Sayre, both of Pa.
[21] Appl. No. 11,742
[22] Filed Feb. 16, 1970
[45] Patented Sept. 28, 1971
[73] Assignee Sylvania Electric Products Inc.

[54] PROCESS AND APPARATUS FOR CHEMICAL MILLING
7 Claims, 8 Drawing Figs.
[52] U.S. Cl. ........................................ 198/33, 198/162
[51] Int. Cl. ........................................ B65q 15/14, B65g 47/24
[50] Field of Search ........................................ 198/33 AD, 22, 161, 162, 203

[56] References Cited
UNITED STATES PATENTS
2,205,702  6/1940  Stewart .................... 198/162 X

*Primary Examiner*—Edward A. Sroka
*Attorneys*—Norman J. O'Malley, Donald R. Castle and William H. McNeill ABSTRACT: An improved process for selectively etching a pattern into a base material by the photochemical method using a photoresist coating over the base material to enable the exposure of an etching solution to selected portions of the base material wherein the article to be etched is coated with the photoresist material and is thereafter continuously advanced and rotated at relatively uniform rates past a stationary spray of etching solution. A conveying system is also disclosed that is capable of simultaneously rotating and linearly advancing an article. The apparatus comprises a first and second spaced-apart conveyor, a movable article carrier therebetween and in engagement with the conveyors and a driving means for each conveyor. The conveyors comprise a driving sprocket, an idler sprocket and an endless carriage in engagement with the sprockets. The endless carriage comprises a core and substantially equally spaced protrusions extending from each side of the core that engage the toothlike configuration of the periphery of each side of the sprockets. The carriages of each conveyor engages the article carrier to provide the linear movement. Differing the linear speeds or direction of travel of the two carriages enables variations in the rotational and linear movement of the article carrier.

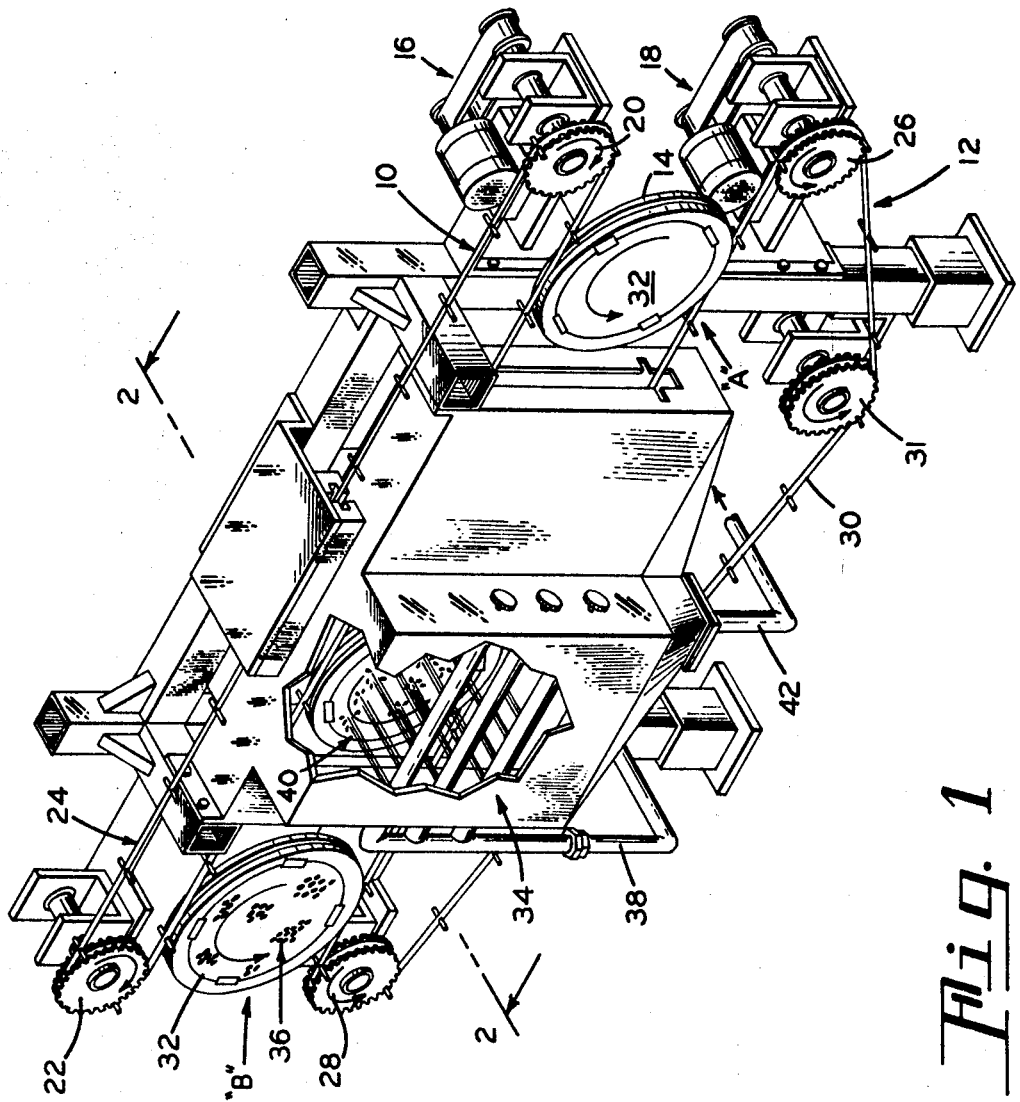
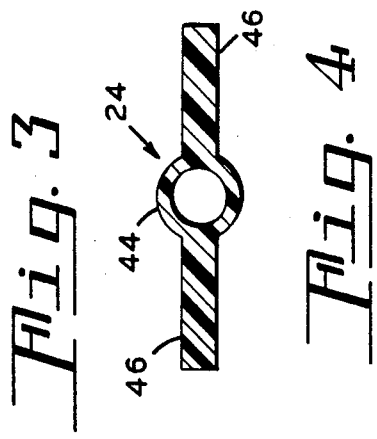
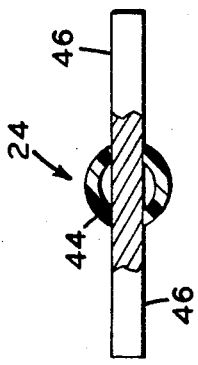
INVENTORS.
JOSEPH P. LAGERMASINI &
LEADOM A. WARNER
BY Donald R. Castle
ATTORNEY

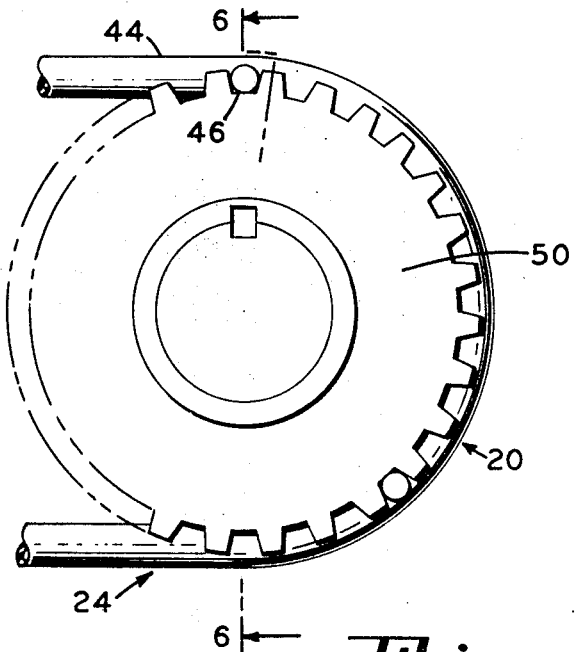
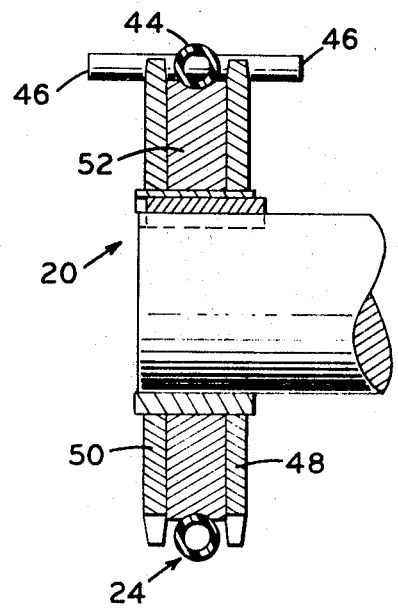
Fig. 5      Fig. 6
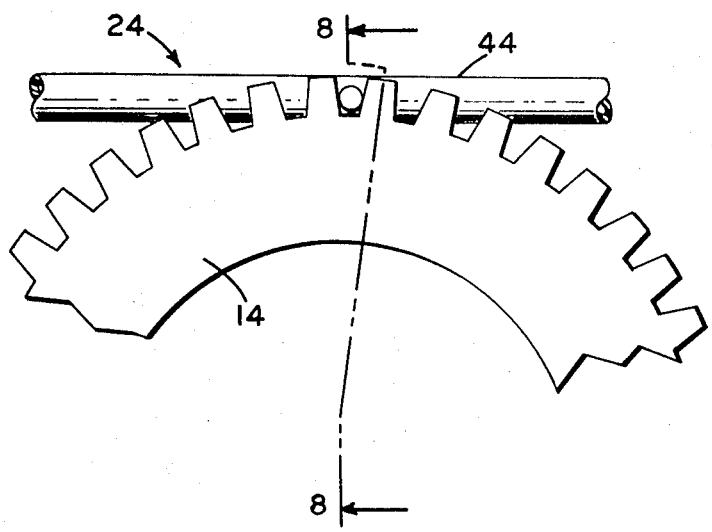
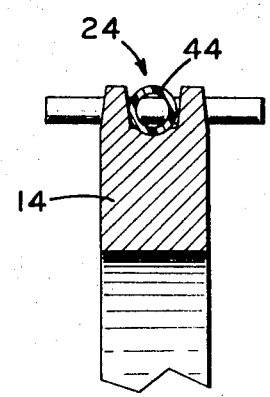
Fig. 7      Fig. 8
*INVENTORS.*
JOSEPH P. LAGERMASINI &
LEADOM A. WARNER
BY Donald R. Castle
ATTORNEY

PROCESS AND APPARATUS FOR CHEMICAL MILLING

BACKGROUND OF THE INVENTION

This invention relates to an improved etching process and to conveying apparatus that is capable of providing dual directional movement to an article being conveyed. More particularly, it relates to an improved etching process wherein an article that is coated with a photoresist is exposed to a more uniform application of etching solution. It also relates to a conveying system that is capable of providing both rotational and linear movement to an article that is conveyed. It further relates to an endless carriage that positively engages driving and idler sprockets and adapted for engagement with an article carrier to provide movement thereto.

Most conveying systems provide unitary directional movement to the article being conveyed. For example, numerous conveyors of the belt, chain and vibratory type prove linear movement to the article being conveyed. Such movement can be in a horizontal or vertical direction or a combination thereof to give an angular movement. In these conveyors primarily linear movement is provided to the article being conveyed. Rotational movement of the articles being conveyed has been normally imparted to the articles while they are not in linear motion.

Additionally, in many instances, the conveying carriage and the carrier can be subjected to corrosive conditions such as when the article being conveyed is subjected to an etching operation. If the article that is being etched is of a metal nature, there are difficulties in obtaining economical materials of construction that will withstand the corrosive conditions thus eliminating or reducing failures and downtime. Materials that are coated or are of a nature to offer resistance to the materials commonly used as etchants add an appreciable amount of cost to the conveying system.

Chemical milling processes are processes that involve etching of a material particularly in those processes wherein a pattern is selectively etched in a base material using a photoresist coating over the base material to enable the exposure of an etching solution to a selected portion of the base material. It has generally been recognized that a uniform application of the etching solution over the complete article to be etched yields benefits in processing and quality. Various devices such as rotating sprays, complex arrangements of sprays and the like have heretofore been used to obtain uniformity in the application of the etching solution to the article to be etched. Although these devices have obviated some of the problems of nonuniformity they have not completely solved the problems because of varying pressures and varying spray patterns upon the surface of the coated article. Furthermore, in most instances, the etching action is generally stopped by water that is applied by sprays. Uniform application is required in order that uniform etching is achieved, therefore, the conveyor can also be used advantageously at the washing step.

Typical conveying mechanisms are generally of either the positively engaging type such as of the chain and sprocket type or of the frictionally engaging type such as flat belt conveyors or V-belt-driven conveyors. These types of conveyors normally yield only linear movement to the article being conveyed. Other rotational means have to be provided for the desired rotational movement.

OBJECTS AND SUMMARY OF THE INVENTION

It is an object of this invention to provide a conveying system capable of imparting simultaneous linear and rotational movement to the article being conveyed.

It is another object of this invention to provide a conveying system that can be constructed from materials that are resistant to a corrosive atmosphere.

It is a further object of this invention to provide an improved process for selective etching a base material.

It is believed, therefore, that an invention that achieves the before-mentioned objects is an advancement in the art.

In accordance with one aspect of this invention there is provided a conveying system capable of providing linear and rotational movement to an article being conveyed that comprises a first and second conveyor and a movable article carrier for the article being conveyed located in between the conveyors and driving means for each conveyor. In accordance with another aspect of this invention, there is provided a unique conveyor that comprises a driving sprocket, an idler sprocket and an endless carriage that comprises a core and substantially equally spaced protrusions extending from opposite side of the core. The article carrier is adapted for engaging the carriages of the first and second conveyors thus enabling the carriages to impart the desired movement to the article carrier. In accordance with an additional aspect of this invention, there is provided an improvement to the process wherein a pattern is selectively etched into a base material by the photochemical method using a photoresist coating over the base material, thereby enabling the exposure of an etching solution to selected portions of the base material. The improvement comprises continuously advancing the article at a relatively uniform rate past a stationary spray of the etching solution while simultaneously rotating the article at a relatively uniform speed.

BRIEF DESCRIPTION OF THE DRAWINGS

FIG. 1 is an isometrical view of the conveying system of this invention being utilized in an etching process.

FIG. 3 is a detailed sectional view of one embodiment of the endless carriage of this invention.

FIG. 4 is a detailed sectional view of an alternative embodiment of the endless carriage of this invention.

FIG. 5 is a sectional side view of the driving or idler sprocket.

FIG. 6 is a sectional end view of the driving or idler sprocket.

FIG. 7 is a sectional side view of one embodiment of the article carrier.

FIG. 8 is a sectional end view of the article carrier.

DETAILED DESCRIPTION OF THE DRAWINGS AND PREFERRED EMBODIMENTS

Figure 2:
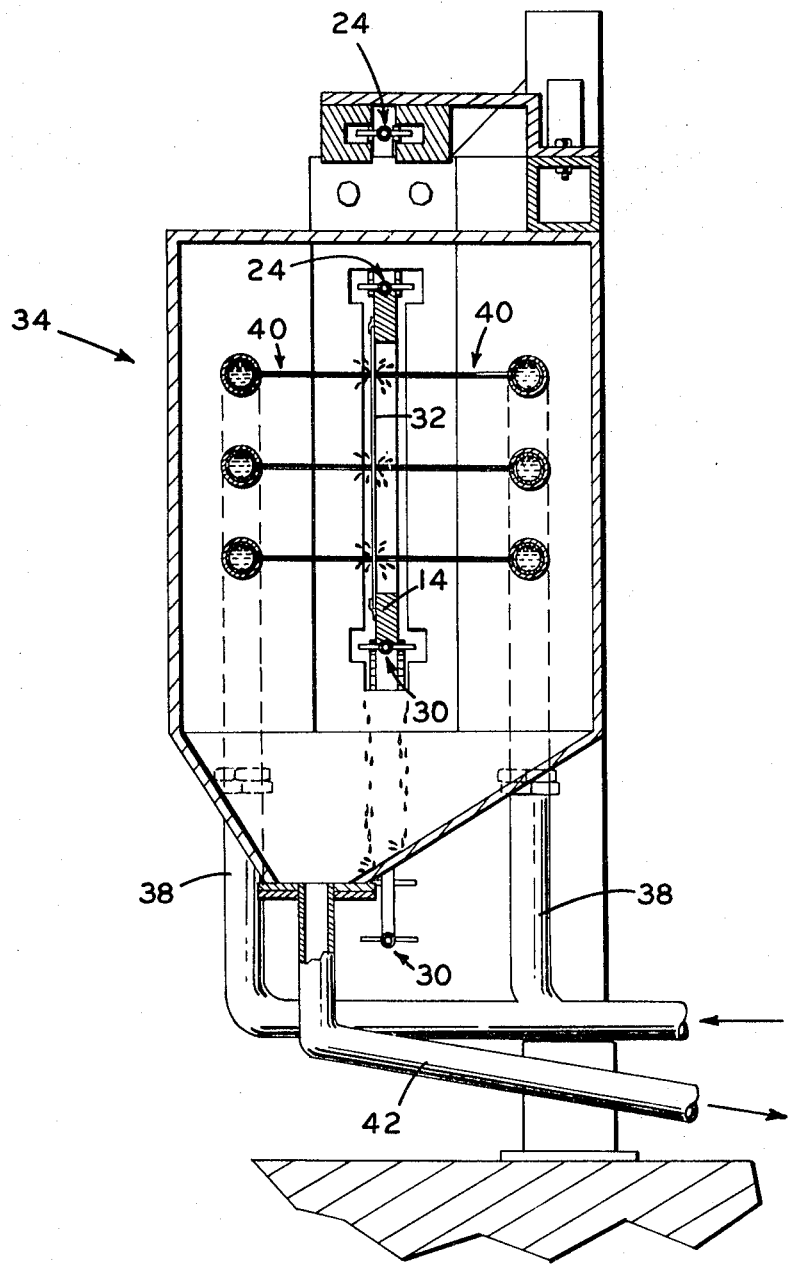
FIG. 2 is an elevational view along the line 2—2 of FIG. 1.

With particular reference to Fig. 1 that illustrates the conveying system of this invention being utilized in a chemical etching operation, the system comprises a first conveyor 10, a second conveyor 12, an article carrier 14, driving means for the first conveyor 16, and a driving means for the second conveyor 18. The first conveyor 10 and the second conveyor 12 are spaced apart with the article carrier 14 therebetween. The first conveyor 10 comprises a driving sprocket 20 to which the driving means 16 is connected, an idler sprocket 22 spaced apart from the driving sprocket 20 and an endless carriage 24 for the first conveyor that passes over both sprockets 20 and 22 of the upper conveyor. The second conveyor 12 is comprised of the same basic components, that is, a driving sprocket 26, an idler sprocket 28 and an endless carriage 30. The article carrier 14 frictionally engages the endless carriage 24 for the first conveyor 10 and the endless carriage 30 for the second conveyor 12. In the specific embodiment shown an additional idler sprocket 31 is provided as a tensioning device. The first conveyor-driving means 16 provides a rotational movement to the upper conveyor carriage 24 which is in frictional engagement with the article carrier 14. The second conveyor 12 operates in a similar manner. The frictional engagement of the two carriages, 24 and 30, with the article carrier 14 provides linear movement thereto. The particular rotation and linear movement of the article carrier 14 will be dependent upon the direction and speed of rotation of the driving sprockets 20 and 26. If the direction of rotation of the driving sprockets 20 and 26 is such that carriages, 24 and 30 move in the same direction rotational movement of the article carrier 14 will depend upon the relative speed of rotation of driving sprockets 24 and 26. If the speed of rotation of 20 and 26 is the same and carriages 24 and 30 move in the same directions no rotational movement is provided. If the direction of rotation of driving sprockets 20 and 26 is such that it imparts movement of carriages 24 and 30 in opposite directions, the direction of rotation and the speed of rotation of the article carrier 14 will depend upon the relative speed of rotation of the driving sprockets. When the carriages 24 and 30 are moving in opposite directions at the same speed only rotational movement will be transmitted to the article carrier 14. In the particular embodiment shown, that is a chemical etching apparatus, an article 32 that has been coated with photoresist material and in a condition for etching is mounted on an article carrier 14 and placed in the conveying system at position A. The article moves to the etching station 34 where stationary sprays (not shown) provide a spray of etching solution in a set pattern upon the article. Etching can be conducted from either side of the article or from both sides simultaneously by procedures well known in the chemical milling art.

During the time the article 32 is in the etching station 34, the article moves linearly and rotates at a speed that is dependent upon the relative speed of linear movement of the two carriages. In some instances, the uniform application that is achieved by the rotational movement is necessary to obtain the desired uniformity of etching that is required by users of some of the products that can be produced by the utilization of this invention. After application of etching solution to the article 32, the pattern 36 is etched and is advanced to position B. The article is removed from the carrier and further treated by procedures well known in the chemical milling art. Although the unique conveying system has been described in relation to utilization in a chemical etching process, it is readily apparent to those skilled in the conveying art that the conveying system can be utilized in various other processes, such as painting, coating or any process where a uniform application of a material capable of being sprayed is to be applied to an article.

With particular reference to FIG. 2, a cross-sectional elevational view of the conveying system illustrated in FIG. 1 taken along line 2—2 of FIG. 1 at the etching station 34 is shown. The etching solution supply headers 38 have sprays 40 that provide a desired spray pattern upon the article 32 that is attached to the article carrier 14. The article carrier 14 is frictionally engaged with the first conveyor carriage 24 and the second conveyor carriage 30. The excess etching solution is collected at the lower portion of the etching station and return through a return header 42 to etching solution storage (not shown). As can be appreciated a water washing station (not Shown) can also be provided in series with the etching stations.

In particular reference to FIG. 3, one embodiment of the endless carriage 24 useful in the upper and lower conveyors is shown. The carriage 24 comprises a core 44 and several protrusions 46. Although the cross section of core 44 is shown as being circular, any similar shape such as hexagonal, octagonal, square, oval and the like can be used. Additionally, since the embodiment that is shown is illustrated in respect to chemical milling, the core is shown as plastic such as the various polymeric plastic materials such as the polyethylene, polypropylene polymer, polyvinyl chloride and the like. In the embodiment shown in FIG. 3 the protrusions 46 are provided by inserting a continuous titanium pin, although other etching-solution-resistant metals can be used, through the core 44. It is necessary to have protrusions that are substantially equally spaced and on opposite sides of the core for reasons explained hereinafter in reference to the driving sprockets.

With particular reference to FIG. 4, an alternative embodiment is shown wherein the protrusions 46 are of the same material as the core 44. Metals that are resistant to the atmosphere to which the carriage 24 is exposed can be used in place of the plastic shown.

In reference to FIGS. 5 and 6, sections of the driving sprocket 20 are shown. The periphery of each of the side sections 48 and 50 are tooth shaped to receive the protrusions 46 that extend from opposite sides of the core 44. The spacer section 52 has a periphery that is adapted to receive the core 44. The sprocket 20 is attached to the driving means (not shown) by methods known in the art such as a key and keyway that is illustrated. It is to be noted that although the side sections 48 and 50 and the spacer section 53 are shown as being separate, the sprocket can be of unitary construction as long as the overall configuration of the sprockets are substantially the same shape as described.

In reference to FIGS. 7 and 8, sections of an alternative embodiment of the article carrier 14 are shown. The carriage 24 is in positive engagement with the article carrier 14 since the article carrier 14 has a tooth-shaped configuration of its outer periphery thereby adapted to receive the protrusions of the carriage 24.

While there have been shown and described what are at present considered the preferred embodiments of the invention, it will be obvious to those skilled in the art that various changes and modifications may be made therein without departing from the scope of the invention as defined by the appended claims.

What is claimed is:

1. A conveying system capable of providing linear and rotational movement to an article being conveyed comprising a first and second spaced-apart conveyors, a movable article carrier therebetween and in engagement with each conveyor and driving means for each of said conveyors, said first and second conveyor comprising
    a. a driving sprocket,
    b. an idler sprocket spaced apart from said driving sprocket and
    c. an endless carriage therebetween, said carriage comprising a core and substantially equally spaced protrusions extending from opposite sides of said core, said sprockets having two side sections each having a toothlike periphery for engagement with said protrusions and a spacer section between said side section for receiving said core and a ring-shaped article carrier having a periphery adapted to engage said carriage.

2. A conveying system according to claim 1 wherein said article carrier frictionally engages the core of each carriage.

3. A conveying system according to claim 1 wherein said article has a toothlike periphery to positively engage said protrusions of each carriage.

4. A subassembly for a conveying system comprising:
    a. a driving sprocket,
    b. an idler sprocket apart from said driving sprocket, and
    c. an endless carriage therebetween said carriage comprising a core and substantially equally spaced protrusions extending from opposite sides of said core, said sprockets having two side sections each having a toothlike periphery for engagement with said protrusion and a spacer section between the two side sections for receiving said core.

5. A subassembly according to claim 4 wherein the cross section of said core is substantially circular and said protrusions are continuous pins.

6. A subassembly according to claim 5 wherein said core is plastic and said protrusions are formed from an etching resistant metal.

7. A subassembly according to claim 5 wherein said core and said protrusions are constructed from the same materials of construction.